United States Patent
Cheng et al.

(10) Patent No.: US 8,472,411 B2
(45) Date of Patent: Jun. 25, 2013

(54) METHODS AND SYSTEMS FOR MULTI-USER DETECTION IN CDMA-BASED COMMON CHANNELS AND COMPUTER PROGRAM PRODUCTS THEREOF

(75) Inventors: Ray-Guang Cheng, Taipei (TW); Yu-Feng Chou, Taipei (TW)

(73) Assignee: Industrial Technology Research Institute, Chutung (TW)

( * ) Notice: Subject to any disclaimer, the term of this patent is extended or adjusted under 35 U.S.C. 154(b) by 330 days.

(21) Appl. No.: 13/042,020

(22) Filed: Mar. 7, 2011

(65) Prior Publication Data
US 2012/0120923 A1 May 17, 2012

(30) Foreign Application Priority Data
Nov. 12, 2010 (TW) .............................. 99138933 A

(51) Int. Cl.
H04B 7/216 (2006.01)
H04B 7/212 (2006.01)
H04W 4/00 (2009.01)

(52) U.S. Cl.
USPC ........... 370/335; 370/322; 370/329; 370/341; 370/348

(58) Field of Classification Search
USPC .................. 370/320, 328, 329, 335, 342, 441
See application file for complete search history.

(56) References Cited

U.S. PATENT DOCUMENTS

| | | | |
|---|---|---|---|
| 6,724,809 B2 | 4/2004 | Reznik | |
| 7,630,344 B1 | 12/2009 | Kilfoyle et al. | |
| 2001/0000456 A1* | 4/2001 | McGowan | 370/342 |
| 2004/0202231 A1 | 10/2004 | Wang et al. | |
| 2005/0221848 A1* | 10/2005 | Chitrapu et al. | 455/502 |
| 2005/0281214 A1* | 12/2005 | Misra et al. | 370/321 |
| 2007/0110132 A1* | 5/2007 | Guess et al. | 375/148 |
| 2008/0112382 A1* | 5/2008 | Shim et al. | 370/342 |
| 2009/0323777 A1* | 12/2009 | Wang et al. | 375/148 |

OTHER PUBLICATIONS

"Decorrelating Decision-Feedback Multiuser Detector for Synchronous Code-Divison(sic) Multiple-Access Channel"; Alexandra Duel-Hallen; IEEE Transactions on Communications, vol. 41, No. 2, Feb. 1993, pp. 285-290.

"Indicaton of Multple NACKs in a Single PRU"Ray-Guang Cheng and Feng-Ming Yang; National Taiwan University of Science and Technology.

(Continued)

*Primary Examiner* — Asad Nawaz
*Assistant Examiner* — Joel Hamel
(74) *Attorney, Agent, or Firm* — Wang Law Firm, Inc.; Li K. Wang; Stephen Hsu

(57) ABSTRACT

Methods for multi-user detection in a CDMA-based channel for use in a base station receiver are provided. Signals, each including a CDMA code, are received. Correlation operations are performed on CDMA codes of received signals respectively to obtain corresponding first correlation values. CDMA codes are divided into first and second code groups according to a threshold and corresponding first correlation values. An interference cancellation procedure is performed on received signals to remove signals corresponding to first code group therefrom and to obtain a removed signal. Correlation operations are performed on CDMA codes of removed signal to obtain corresponding second correlation values. Each first correlation value is subtracted from a corresponding second correlation value and compared with a threshold to generate a comparison result. Whether CDMA codes within first code group are correct are determined according to comparison results, wherein the threshold is dynamically adjusted according to comparison results.

21 Claims, 4 Drawing Sheets

OTHER PUBLICATIONS

"Multiuser Detection for CDMA Systems"; Alexandra Duel-Hallen, Jack Holtzman, and Zoran Zvonar; IEEE Personal Communications; Apr. 1995.

"The Effects of Ordering Criteria in Linear Successive Interference Cancellation in CDMA Systems"; Maruf Mohammad and R. Michael Buehrer; IEEE Transactions on Wireless Communications, vol. 7, No. 11, Nov. 2008, pp. 4128-4132.

* cited by examiner

METHODS AND SYSTEMS FOR MULTI-USER DETECTION IN CDMA-BASED COMMON CHANNELS AND COMPUTER PROGRAM PRODUCTS THEREOF

CROSS REFERENCE TO RELATED APPLICATIONS

This application claims priority of Taiwan Patent Application No. 099138933, filed on Nov. 12, 2010, the entirety of which is incorporated by reference herein.

BACKGROUND OF THE INVENTION

1. Field of the Invention

The disclosure relates generally to multi-user detection systems and methods thereof in a Code Division Multiple Access (CDMA)-based channel, and more particularly, to multi-user detection systems and methods thereof capable of utilizing multi-user detection to reduce multiple access interference (MAI) in a CDMA common channel.

2. Description of the Related Art

In cellular systems, a base station may communicate with multiple mobile stations at the same time. For a base station receiver used in an uplink transmission (mobile station→base station), it must simultaneously detect signals from all users. Therefore, multi-user detection (MUD) has been widely used in uplink transmission processes. MUD can simultaneously perform data detection for all users and prior to data decision, information for all the users are combined so that the correctness of decision results can be increased. The MUD may be applied to solve the poor performance problem caused by signal overlap, and interference between signals received from multiple users in the same frequency band.

CDMA is one of the popular coding schemes that most systems adopt, which defines a code for each feedback message such that multiple users may transmit predetermined CDMA codes in a CDMA-based uplink common channel. By using CDMA technology, all the users may feedback messages to the base station in a same shared uplink channel to reduce the number of radio resources required for gathering user information. In the uplink channel, users may feedback messages dependant upon the multiple feedback conditions existing and the receiver side may then utilize the orthogonality of codes to distinguish between the feedback conditions. When transmitting multiple CDMA codes in a channel, however, other codes may also utilize the same resources, which would result in multiple access interference (MAI) such that the receiver may detect a failure.

In general, the receiver was unable to estimate the number of users for each group of codes. Note that for each group of codes, signal powers carried therewith are in proportion to the number of users that use the codes. Therefore, the code signal power difference between codes may be very small or very large. When the code signal power difference between the codes is oversized and increases, MAI effect may increase and gradually become obvious. In this case, codes with small signal powers will be easily overlapped by codes with larger signal powers such that code signals with small powers will not be detected when feedback messages have been detected, thereby causing a detection error.

When the power differences betweens code signals are not large, although the situation where codes with small signal powers being easily overlapped by codes with large signal powers may be avoided, however, due to each code being transmitted with similar power strengths, each code may suffer interferences from other groups of codes, thereby causing a burst error while detecting codes.

The aforementioned situation where codes with small powers are easily overlapped by codes with large powers may be avoided by using a multi-stage signal processing technique in a conventional receiver or adjusting the powers of the codes. Using a multi-stage signal processing technique in a conventional receiver, however, will result in signal processing delay, such that the conventional receiver can not process user requirements for wireless channels in time. Moreover, additional resources may be consumed to acquire and control message so as to control the powers of feedback codes.

On the other hand, when the differences among powers of code signals are small, a fixed threshold may be applied to detect signals, wherein the code signal with the strongest code power among the code signals that exceed the threshold is determined to be the detected signal while those code signals with code powers among the code signals that do not exceed the threshold are determined to be noise. However, because all code signals have similar powers, each code may receive interference from other codes such that the detection value after the multi-user detection for each code may be similar to each other. If the detection values exceed the threshold configured by the receiver, all codes can be detected. If the detection values are less than the threshold, all codes can not be detected. Therefore, burst error may occur.

It is therefore a desire to provide multi-user detection capable of solving the MAI problem.

SUMMARY

Multi-user detection systems and methods for multi-user detection in a CDMA-based channel for use in a base station receiver are provided.

In one exemplary embodiment, a method for multi-user detection in a CDMA-based channel for use in a base station receiver is provided. Signals, each including a CDMA code, are received. Correlation operations are performed on the CDMA codes of the received signals respectively to obtain a plurality of corresponding first correlation values. The CDMA codes are divided into first and second code groups according to a threshold and corresponding first correlation values. An interference cancellation procedure is performed on the received signals to remove signals corresponding to the first code group therefrom and to obtain a removed signal. Correlation operations are performed on the CDMA codes of the removed signal to obtain a plurality of corresponding second correlation values. Each of the first correlation values is subtracted from a corresponding one of the second correlation values and compared with a threshold to generate a comparison result. It is then determined that whether the CDMA codes within the first code group are correct according to the comparison results, wherein the threshold is dynamically adjusted according to the comparison results.

An exemplary embodiment of a multi-user detection system in a CDMA-based channel comprises an antenna unit, a buffer, a first detection unit, a signal regeneration unit, a second detection unit and a feedback control unit. The antenna unit receives signals, each comprising a CDMA code, from a communication channel. The buffer stores the received signals, wherein each received signal comprises a CDMA code and each CDMA code corresponds to a user. The first detection unit is coupled to the buffer for respectively performing correlation operations on the CDMA codes of the received signals to obtain a plurality of corresponding first correlation values and dividing the CDMA codes into first and second code groups according to a threshold and corresponding first correlation values. The signal regeneration unit is coupled to the first detection unit for performing an interference cancellation procedure on the received signals to remove signals corresponding to the first code group therefrom and obtaining a removed signal. The second detection unit is coupled to the signal regeneration unit and the first detection unit for respectively performing correlation operations on the CDMA codes of the removed signal to obtain a plurality of corresponding second correlation values and subtracting each of the first correlation values from the corresponding one of the second correlation values to generate a subtraction result and comparing each subtraction result with a threshold to generate a comparison result, wherein each of the second correlation values correspond to one of the first correlation values. The feedback control unit is coupled to the first detection unit, the signal regeneration unit and the second detection unit for determining whether the CDMA codes within the first code group are correct according to the comparison results, wherein the feedback control unit further adjusts the threshold dynamically according to the comparison results.

Methods for multi-user detection in a CDMA-based channel and multi-user detection using the same may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Exemplary embodiments of multi-user detection systems in a CDMA-based channel and methods for multi-user detection thereof of the invention utilizes the concept of multi-user detection in detection of multiple groups of codes in a same channel to remove an MAI. Moreover, by selectively requesting users to perform a feedback retransmission operation requested by the base station, when determining to request the users to perform the feedback retransmission operation, the base station may obtain time diversity by performing a code signal detection procedure. Thus, when determining to not request the users to perform the feedback retransmission operation, radio resources required for feedback transmission can be saved. In addition, when the multi-user detection system of the invention requests the users to perform the feedback retransmission operation, users that are successfully detected are forbidden from feedback retransmission while users that have not been detected are requested to proceed with feedback retransmission with double transmission power to improve the Signal-to-Interference-and-Noise-Ratio (SINR) of the code signal so as to increase the opportunity that the code signals can be successfully demodulated by the base station.

Figure 1:
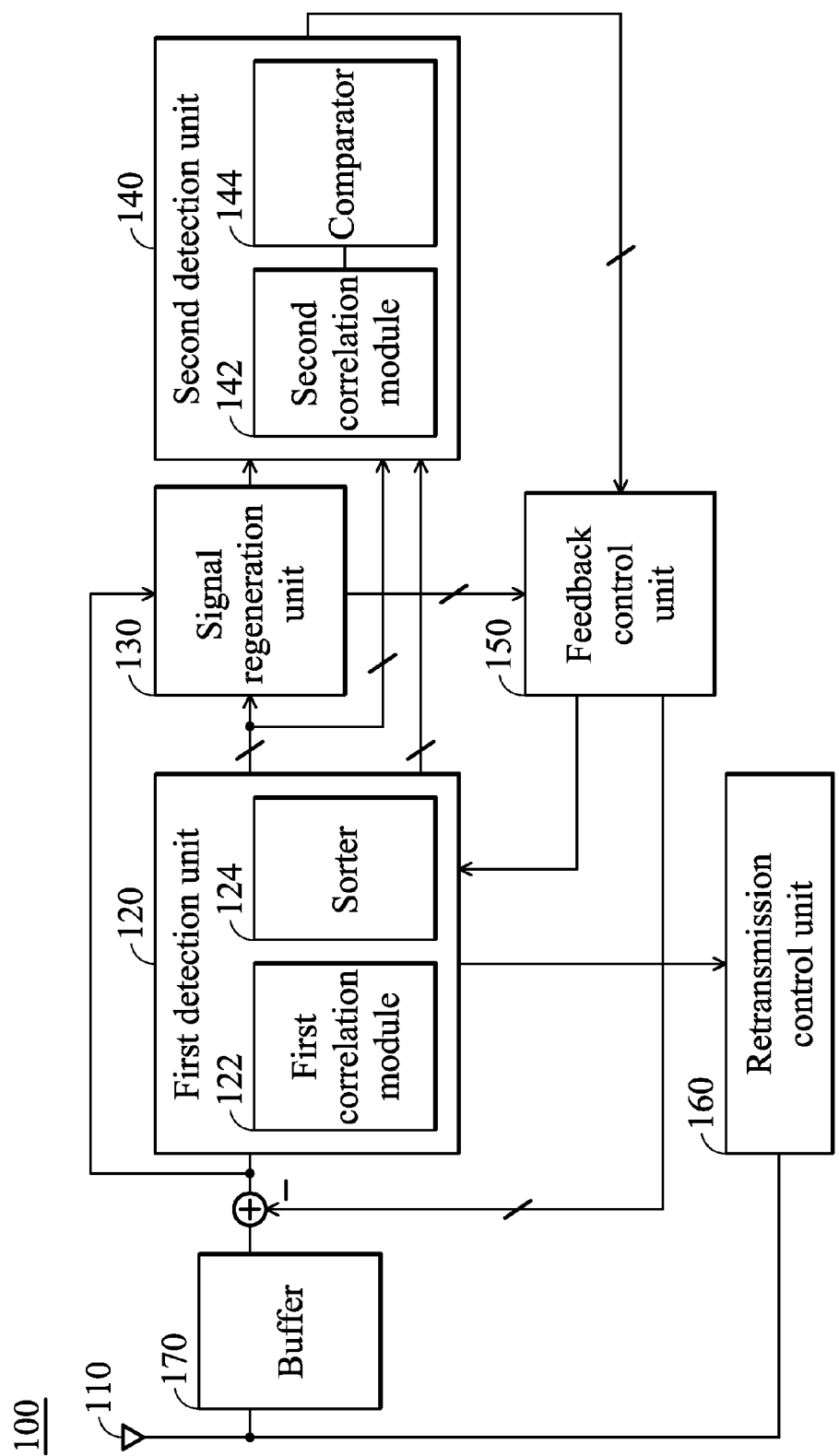
FIG. 1 is a schematic diagram illustrating an exemplary embodiment of a multi-user detection system in a CDMA-based channel of the invention.

FIG. 1 is a schematic diagram illustrating an exemplary embodiment of a multi-user detection system in a CDMA-based channel of the invention. The multi-user detection system 100 of the invention at least comprises an antenna unit 110, a first detection unit 120, a signal regeneration unit 130, a second detection unit 140, a feedback control unit 150, a retransmission control unit 160 and a buffer 170. The antenna unit 110 may receive signals sent from multiple users. In this embodiment, a CDMA technique is applied to make all the users to feedback messages in a same shared uplink channel so as to reduce radio resources required for gathering user information. In this shared uplink channel, users may feedback messages depending on multiple feedback conditions and utilize the orthogonality of codes to distinguish between every feedback condition. An ACK/NACK-based feedback mechanism may be adopted for feedback confirmation to reduce the amount of feedback messages needed. In other words, the antenna unit 110 may simultaneously receive multiple signals in a communication channel, wherein each signal includes a CDMA code and corresponds to a specific user or user group.

The first detection unit 120 may further comprise a first correlation module 122 and a sorter 124, wherein the first correlation module 122 may respectively perform correlation operations on the CDMA codes within the received signals to obtain a plurality of corresponding first correlation values. The sorter 124 may sort the first correlation values obtained by the first correlation module 122 in descending order and then divide the CDMA codes into a first code group and a second code group according to a threshold (first threshold) and the sorted first correlation values. The sorter 124 may determine whether a specific code within the received signals belongs to the first code group or the second code group by determining whether the correlation value of the specific code is higher than the threshold. In one embodiment, the sorter 124 may compare the correlation values generated by the first correlation module 122 with the threshold and divide one or more codes having correlation values exceeding the threshold into the first code group and divide the remaining codes into the second code group. In this embodiment, the first code group is a code group formed by all detected CDMA codes while the second code group is a code group formed by other CDMA codes which have not been detected. Methods for multi-user detection and code group classification will be discussed and detailed as follows.

The signal regeneration unit 130 is coupled to the first detection unit 120 for receiving the codes of the first code group divided by the first detection unit 120, regenerating signals corresponding to the codes of the first code group and performing a successive interference cancellation (SIC) on the regenerated signals to remove signals which correspond to the codes of the first code group from the received signals so as to obtain a removed signal. For example, the signal regeneration unit 130 may regenerate signals corresponding to the first code group as an interference signals and subtracts the interference signals from the received signals to perform the interference cancellation procedure to obtain the removed signal. The SIC detection performs the interference cancellation and signal detection for received signals by sorting and using a correlation operation resultant from a previous iteration. For example, if the signals from a mobile user 1 and a mobile user 2 are both received by the system, the signal from the mobile user 1 is detected first and interference therein is cancelled to obtain the signal from the mobile user 2 based on the SIC detection. In this embodiment, the SIC detection may simultaneously cancel interference from all the codes within the first code group.

The second detection unit 140 may comprise at least a second correlation module 142 and a comparator 144, wherein the second correlation module 142 respectively performs correlation operations on the codes within the removed signal which is generated by the signal regeneration unit 130 to obtain a plurality of corresponding second correlation values. The comparator 144 subtracts each of the first correlation values from the corresponding one of the second correlation values to generate a subtraction result and compares each subtraction result with a threshold to generate multiple comparison results.

The feedback control unit 150 is coupled to the first detection unit 120, the signal regeneration unit 130 and the second detection unit 140 and adjusts the threshold setting provided to the first detection unit 120 according to a determination of whether the CDMA codes within the first code group are correct. If the comparison results indicate that each of the first correlation values subtracted from its second correlation values exceed or are equal to a threshold, the feedback control unit 150 will determine that the CDMA codes within the first code group are correct; otherwise, the feedback control unit 150 will determines that the CDMA codes within the first code group are incorrect. In other words, if the comparison results indicate that at least one of the first correlation values subtracted from its second correlation value exceeds the threshold, the feedback control unit 150 may determine that the CDMA codes within the first code group are incorrect.

When the CDMA codes within the first code group have been determined to be correct, the feedback control unit 150 further records all of the CDMA codes within the first code group into the buffer 170, subtracts the interference signals generated by the signal regeneration unit 130 from the received signals and utilizes the subtracted signals to perform a next detection and interference cancellation procedure. When the CDMA codes within the first code group have been determined to be incorrect, which means that the threshold is set too low, then the feedback control unit 150 will increase the threshold by a specific value. Meanwhile, the first detection unit 120 may re-divide the CDMA codes within the received signals into the first and second code groups according to the adjusted threshold and corresponding first correlation values for further processing.

The retransmission control unit 160 is coupled to the first detection unit 120 for determining whether to request that the users whom are not reported yet to perform a feedback operation with double transmission power according to a second threshold (CV) and all aforementioned correlation values. The second threshold is less than the first threshold. The retransmission control unit 160 may determine whether to request that a portion or all of the users whom are not detected yet to perform a feedback operation based on comparison results of comparing remaining correlation values with the threshold configured by the first detection unit 120. The retransmission control unit 160 may broadcast messages to inform all the undetected users to re-transmit messages when the number of the CDMA codes within the first code group is 0, the maximum correlation value among the remaining correlation values exceeds the decreased second threshold and there is usable radio resources remained. In one embodiment, the retransmission control unit 160 may further apply a bitmap to designate users who need to perform the feedback retransmission operation. For example, the bitmap may include multiple flags and each user corresponds to one of the flags. The retransmission control unit 160 may set flags of users corresponding to detected code signals within the first code group to be 1 and set flags of users corresponding to other undetected code signals to be 0. This bitmap may then be broadcasted to all of the users. Therefore, each user may determine whether to perform the feedback retransmission operation according to its corresponding flag within the bitmap. By broadcasting the bitmap, all of the undetected users that need to perform the feedback retransmission operation can be informed while the detected users do not need to perform the feedback retransmission operation, significantly saving the use of the radio resources. When a user is requested to feedback a message, the user may feedback the message with double transmission power.

The buffer 170 may be used to store all the received signals at beginning and record all detected user codes during the detection process and so on.

Figure 2:
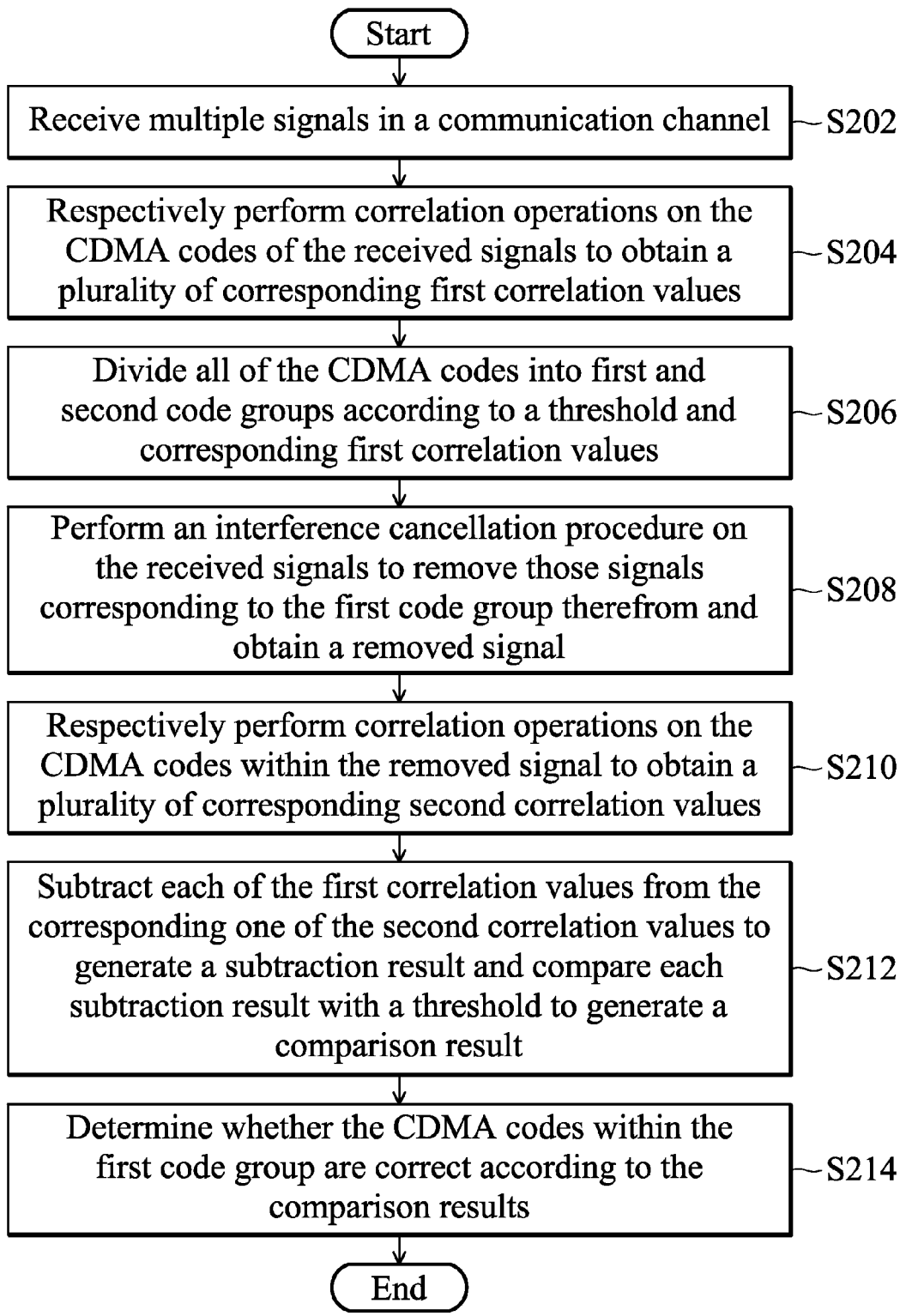
FIG. 2 is a flowchart of a method for multi-user detection according to an embodiment of the invention.

FIG. 2 is a flowchart of a method for multi-user detection according to an embodiment of the invention. Please refer to FIGS. 1 and 2. The method for multi-user detection of the invention can be applied in the multi-user detection system 100 shown in FIG. 1 for detection of feedback messages from different users.

First, in step S202, multiple signals are received in a communication channel. The first detection unit 120 may receive the signals in a commonly used communication channel via the antenna unit 110. Each signal may include a CDMA code and correspond to a specific user or user group. For example, if there are N users that need to perform a feedback operation, the first detection unit 120 may simultaneously receive N signals replied by the N users in a commonly used communication channel via the antenna unit 110.

Next, in step S204, the first detection unit 120 respectively performs correlation operations on the CDMA codes of the received signals to obtain a plurality of corresponding first correlation values.

After obtaining the first correlation values, in step S206, the first detection unit 120 divides all of the CDMA codes into first and second code groups according to a threshold and corresponding first correlation values. The sorter 124 may compare the correlation values generated by the first correlation module 122 with the threshold and divide one or more codes having correlation values exceeding the threshold into the first code group and divide the remaining codes into the second code group.

In step S208, the signal regeneration unit 130 performs an interference cancellation procedure on the received signals to remove those signals corresponding to the first code group therefrom and obtain a removed signal.

In step S210, the second correlation module 142 respectively performs correlation operations on the CDMA codes within the removed signal which is obtained by the signal regeneration unit 130 to obtain a plurality of corresponding second correlation values.

In step S212, the comparator 144 subtracts each of the first correlation values from the corresponding one of the second correlation values to generate a subtraction result and compares each subtraction result with a threshold to generate a comparison result, wherein each of the second correlation values correspond to one of the first correlation values. The comparator 144 may compare each of the first correlation values generated by the first detection unit 120 with its corresponding second correlation value generated by the second detection unit 140 and generate multiple subtraction results.

The comparison result may represent whether each of the first correlation values subtracted from its corresponding second correlation value exceeds a threshold.

After the comparator 144 generates the comparison results, in step S214, the feedback control unit 150 determines whether the CDMA codes within the first code group are correct according to the comparison results. According to the concept of MAI, as the number of the code being used increases, the SINR thereof will become poor. As a result, the maximum output values of the correlation modules will also become small and the correlation values for those codes which are not being used should be very small. Therefore, whether the CDMA codes within the first code group are correct or not may be determined utilizing this concept.

If the comparison results indicate that all of the first correlation values exceed or are equal to their second correlation values, the feedback control unit 150 will determine that the CDMA codes within the first code group are correct; otherwise, the feedback control unit 150 will determine that the CDMA codes within the first code group are incorrect. In other words, if the comparison results indicate that at least one of the first correlation values is less than its second correlation value, the feedback control unit 150 will determine that the CDMA codes within the first code group are incorrect.

When the CDMA codes within the first code group have be determined to be correct, the feedback control unit 150 further records all of the CDMA codes within the first code group into the buffer 170, subtracts the interference signals generated by the signal regeneration unit 130 from the received signals and utilizes the subtracted signals to return to step S204 to perform a next detection and interference cancellation procedure. Due to the second detection and interference cancellation being performed on the signals for which the interferences from the detected code signals haven been removed, detection error rates of the undetected codes can be decreased.

When the CDMA codes within the first code group have be determined to be incorrect, which means that the threshold is set too low, the feedback control unit 150 will increase the threshold by a specific value and re-perform steps S206-S214. Meanwhile, the first detection unit 120 may re-divide the CDMA codes within the received signals into the first and second code groups according to the increased threshold and corresponding first correlation values for further processing.

Therefore, the feedback control unit 150 may generate a non-fixed threshold Th according to results feedback by all of current code signals through the correlation modules, the sorter and the comparator and retrieve codes based on current correlation values of the codes or the results of previous signal detection rather than retrieval by only relying on the strengths of the correlation values, thereby avoiding occurrences of burst errors or error propagations caused by the fixed threshold setting.

The parallel level of the system 100 could be increased when the number of codes being selected in the first code group is increased, speeding up the processing of code signals and improving system performance.

In some embodiments, the method for multi-user detection of the invention may further provide a selective retransmission mechanism to selectively request the undetected users to perform the feedback retransmission operation. The retransmission control unit 160 may configure a second threshold $CV=Th*\beta$ and then determine whether to request that the users whom are not reported yet to perform a feedback retransmission operation with double transmission power according to the second threshold (CV) and all aforementioned correlation values, wherein the second threshold is less than the first threshold. The retransmission control unit 160 may determine whether to request that a portion or all of the users whom are not detected yet to perform a feedback transmission operation based on comparison results of comparing remaining correlation values with the threshold configured by the first detection unit 120. When the number of CDMA codes within the first code group is 0, the maximum correlation value among the remaining correlation values exceeds the decreased second threshold and there is usable radio resources remaining, thus, the retransmission control unit 160 may broadcast messages to inform all the undetected users to re-transmit their messages. In one embodiment, the retransmission control unit 160 may further apply a bitmap to designate users who need to perform the feedback retransmission operation. For example, the bitmap may include multiple flags and each user would correspond to one of the flags. The retransmission control unit 160 may set flags of users corresponding to detected code signals within the first code group to be 1 and set flags of users corresponding to other undetected code signals to be 0. This bitmap may then be broadcasted to all of the users. Therefore, each user may determine whether to perform the feedback retransmission operation according to its corresponding flag within the bitmap. By broadcasting the bitmap, all of the undetected users that need to perform the feedback retransmission operation can be informed while the detected users who do not need to perform the feedback retransmission operation would not be informed, significantly saving the use of the radio resources. Moreover, when a user is requested to feedback a message, the user may feedback the message with double transmission power.

For explanation, one specific embodiment is illustrated in the following to explain the detailed process of a method for multi-user detection of the invention, and those skilled in the art will understand that this specific embodiment is used for explanation only and the invention is not limited thereto.

Figure 3A:
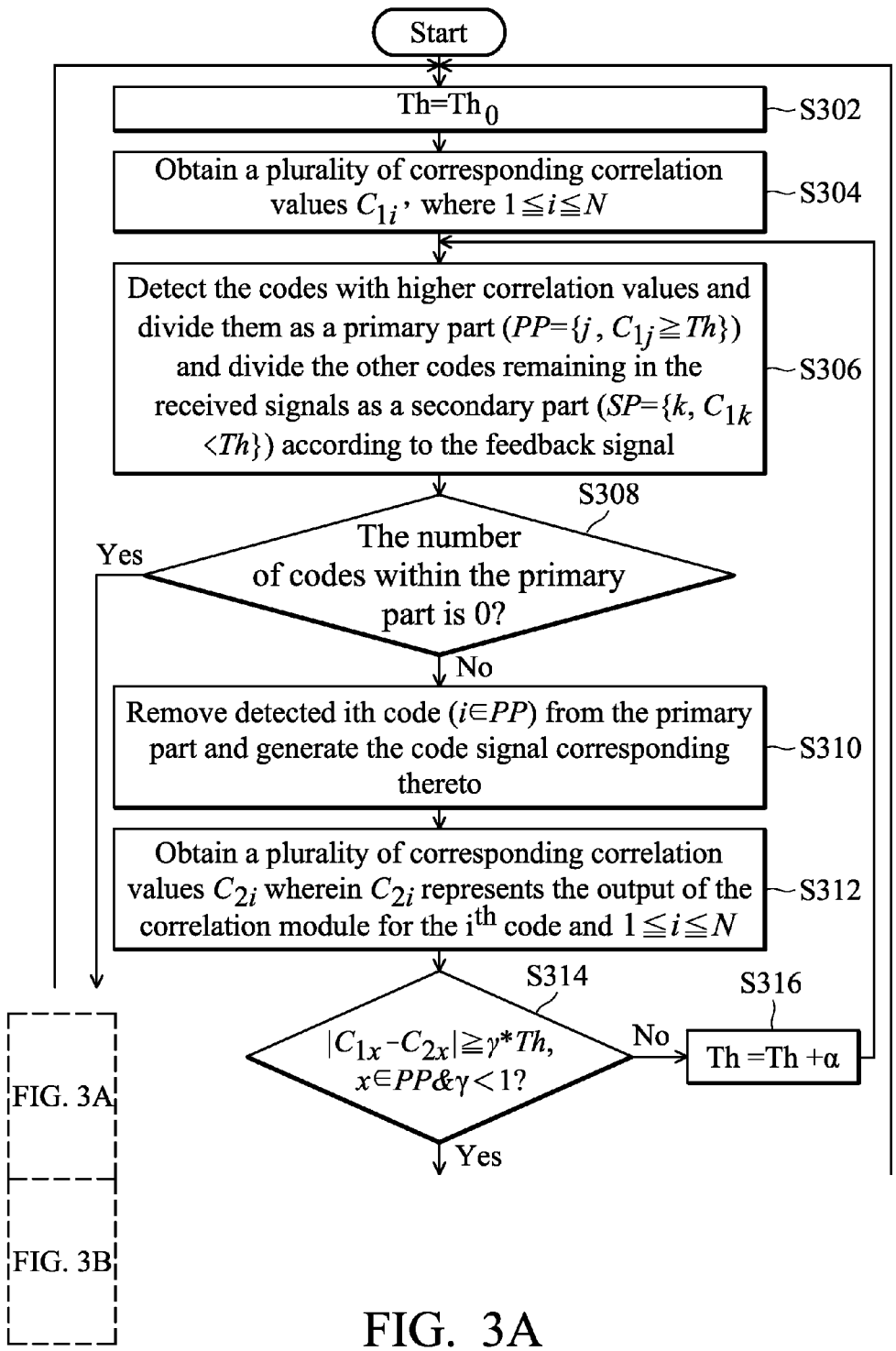
FIGS. 3A and 3B are flowcharts of a method for multi-user detection according to another embodiment of the invention, which illustrate how to dynamically adjust the threshold and perform a feedback retransmission operation according to the feedback information.
Figure 3B:
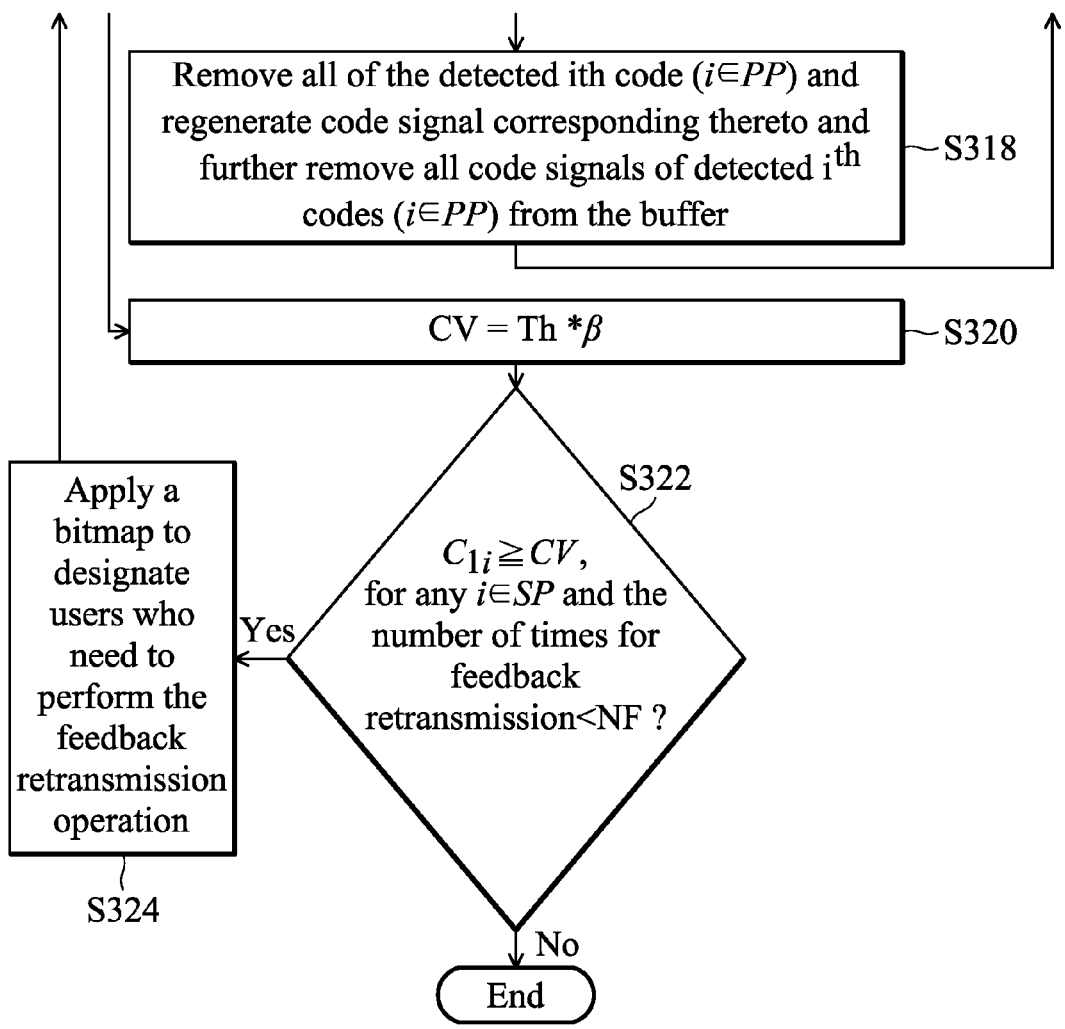

FIGS. 3A and 3B are flowcharts of a method for multi-user detection according to another embodiment of the invention, which illustrate how to dynamically adjust the threshold and perform a feedback retransmission operation according to the feedback information. Please refer to FIGS. 1, 3A and 3B. The method for multi-user detection of the invention can be applied in the multi-user detection system 100 that is applied in a CDMA-based channel shown in FIG. 1 for detection of feedback messages from different users.

First, values $Th_0$, $\alpha$, $\beta$ are initialized, wherein value N represents the number of codes that the base station has used and value NF represents the maximum number of times to perform the feedback retransmission operation (step S302). Note that $Th_0$, $\alpha$, $\beta$, $\gamma$, N and NF may be configured to any arbitrary number.

Next, the received signals are stored in the buffer 170, wherein correlation operations are further performed thereon through the first correlation module 122 to obtain a plurality of corresponding correlation values $C_{1i}$, wherein $1 \leq i \leq N$ (step S304). The sorter 124 may then detect the codes with higher correlation values and divide them as a primary part (PP=$\{j, C_{1j} \geq Th\}$) and divide the other codes remaining in the received signals as a secondary part (SP=$\{k, C_{1k} \leq Th\}$) according to the feedback signal which is feedback from the comparator (step S306). In this step, the codes with the correlation values higher than the threshold may be divided as the "primary part" (first code group) and the other codes may remain in the "secondary part" (second code group). In this embodiment, the sorter 124 may simultaneously select multiple codes with higher correlation values as the primary part for subsequent detection in order to improve the processing speed of code signal detection.

Next, it is determined whether the number of codes within the primary part is 0 (step S308). If so, which means that no correlation value has exceeded the threshold Th, which may mean that codes can not be detected or there is noise interference, step S320 will be further performed. Otherwise, step S310 is further performed.

If the number of codes within the primary part is not 0, which means that at least on code has been detected, the detected $i^{th}$ code (i∈PP) will be removed and the code signal corresponding thereto will be regenerated such that signals corresponding to the primary part will be regenerated and the regenerated signals may further be subtracted from the originally received signals so as to cancel the MAI from the "primary part" (step S310). Next, correlation operations may further be performed on the output signals after the SIC is performed thereon through the second correlation module 142 of the second detection unit 140 to obtain a plurality of corresponding correlation values $C_{2i}$, wherein $C_{2i}$ represents the output of the correlation module for the $i^{th}$ code and $1 \leq i \leq N$ (step S312). Then, a last detection result is further fed back to the first detection unit 120 in the previous stage to determine whether the code members belong to the "primary part" are correct by determining whether the condition of $|C_{1x}-C_{2x}| \geq \gamma Th$, x∈PP is satisfied (step S314). If not (No in step S314), the feedback control unit 150 increases the threshold Th by a specific value (Th=Th+α) (step S316) and returns to step S306 to re-perform steps S306-S314 with the new threshold for a next signal detection and interference cancellation.

If $|C_{1x}-C_{2x}| \geq \gamma*Th, x∈PP$ & $\gamma<1$ (Yes in step S314), it means that codes members belong to the "primary part" are correct. Therefore, the feedback control unit 150 removes the detected $i^{th}$ code (i∈PP) regenerates code signal corresponding thereto, removes all code signals of detected $i^{th}$ codes (i∈PP) from the buffer 170 (step S318) and returns to step S302 to re-perform detection for the undetected part.

If it is determined that the number of codes within the primary part is 0 in step S308, a second threshold CV (CV=Th*β) configured to determine whether to request a selective feedback retransmission (step S320). Thereafter, the retransmission control unit 160 records the last output $C_{1i}$ of the first correlation value in the sorter 124 based on the last result that the sorter 124 provided to the comparator 144 and compares whether the correlation values corresponding to the codes within the "secondary part" exceed or are equal to the decreased threshold ($C_{1i} \geq CV$ and i∈SP) (step S322). If the correlation values corresponding to the codes within the "secondary part" exceed or are equal to the decreased threshold ($C_{1i} \geq CV$ and i∈SP) and there is usable radio resources remaining (the number of times for feedback retransmission<NF) (Yes in step S322), then, the retransmission control unit 160 may broadcast messages to inform all of the undetected users to re-transmit, wherein the undetected users may feedback the message with double transmission power while the detected users do not need to perform the feedback retransmission operation. Similarly, the retransmission control unit 160 may further apply a bitmap to designate users who need to perform the feedback retransmission operation (step S324). Thereafter, step S302 will be repeated for a next round of detection. If the correlation values corresponding to the codes within the "secondary part" are less than the decreased threshold ($C_{1i}<CV$) (No in step S322), the retransmission control unit 160 will not request all the undetected users to re-transmit, thus the flow ends.

In summary, according to the multi-user detection systems in a CDMA-based channel and methods for multi-user detection thereof of the invention, the concept of the multi-user detection can be utilized in detection of multiple sets of codes in the same channel to remove the MAI and signal detection capability for the receiver can be efficiently improved by the base station that selectively requests users to perform a feedback retransmission operation. In addition, according to the multi-user detection systems in a CDMA-based channel and methods for multi-user detection thereof of the invention, by dynamic threshold configuration, the system may adjust the threshold based on real communication environments using a non-fixed threshold, thereby improving the system performance and speeding up the calculation speed. Moreover, correctness of multi-user detection cancellation can be further confirmed using the feedback signal control sorter in the comparator of the second detection unit. Furthermore, by the retransmission unit controlling whether to request a feedback, error detection probability can be efficiently reduced so as to obtain a trade-off between probabilities for successful code detection and saving of radio resources.

Methods for multi-user detection in a CDMA-based channel for use in a base station receiver and systems thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of exemplary embodiment, it is to be understood that the invention is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A method for multi-user detection in a Code Division Multiple Access (CDMA)-based channel for use in a base station receiver, comprising:
   receiving signals, each comprising a CDMA code, from a communication channel;
   respectively performing correlation operations on the CDMA codes of the received signals to obtain a plurality of corresponding first correlation values;
   dividing the CDMA codes into first and second code groups according to a first threshold and corresponding first correlation values;
   performing an interference cancellation procedure on the received signals to remove signals corresponding to the first code group therefrom and obtaining a removed signal;
   respectively performing correlation operations on the CDMA codes of the removed signal to obtain a plurality of corresponding second correlation values, wherein each of the second correlation values correspond to one of the first correlation values;

subtracting each of the first correlation values from the corresponding one of the second correlation values to generate a subtraction result and comparing each subtraction result with a second threshold to generate a comparison result; and determining whether the CDMA codes within the first code group are correct according to the comparison results, wherein the first threshold is dynamically adjusted according to the comparison results.

2. The method as claimed in claim 1, wherein the determination step further comprises:

determining the CDMA codes within the first code group to be correct when the comparison results corresponding thereto indicate that all of the subtraction results, each generated by subtracting each of the first correlation values from the corresponding second correlation value, exceed the first threshold.

3. The method as claimed in claim 2, further comprising:

determining the CDMA codes within the first code group are incorrect when the comparison results corresponding thereto indicate that at least one of the subtraction results generated by subtracting one of the first correlation values from the corresponding second correlation value is less than the first threshold; and increasing the first threshold by a specific value to generate a third threshold and re-dividing the CDMA codes into the first and second code groups according to the third threshold and corresponding first correlation values for further processing.

4. The method as claimed in claim 1, wherein the step of obtaining the removed signal further comprises:

regenerating signals corresponding to the first code group as interference signals; and subtracting the interference signals from the received signals to perform the interference cancellation procedure so as to obtain the removed signal.

5. The method as claimed in claim 1, further comprising:

when the number of the CDMA codes within the first code group is 0, determining whether a maximum correlation value among the second correlation values that correspond to the second code group exceeds a third threshold, wherein the third threshold is less than the first threshold; and if a maximum correlation value among the second correlation values that correspond to the second code group exceeds the third threshold, selectively requesting users corresponding to the second code group to perform a feedback retransmission operation.

6. The method as claimed in claim 5, further comprising:

when a user is requested to feedback a message, directing the user to feedback the message with double transmission power.

7. The method as claimed in claim 5, further comprising:

applying a bitmap to designate users who need to perform the feedback retransmission operation.

8. The method as claimed in claim 1, wherein the step of dividing the CDMA codes into the first and second code groups further comprises:

when the first correlation value corresponding to a first CDMA code of the CDMA codes exceeds or is equal to the first threshold, classifying the first CDMA code into the first code group; and when the first correlation value corresponding to the first CDMA code of the CDMA codes is less than the first threshold, classifying the first CDMA code into the second code group.

9. The method as claimed in claim 1, further comprising:

storing all of the CDMA codes within the first code group after determining that the CDMA codes within the first code group to be correct;

regenerating signals corresponding to the first code group as interference signals; and subtracting the interference signals from the received signals.

10. The method as claimed in claim 1, wherein the interference cancellation is performed to cancel the interference by a successive interference cancellation (SIC).

11. A multi-user detection system in a Code Division Multiple Access (CDMA)-based channel, comprising:

an antenna unit, receiving signals, each comprising a CDMA code, from a communication channel;

a buffer, storing the received signals, wherein each received signal comprises a CDMA code and each CDMA code corresponds to a user;

a first detection unit coupled to the buffer, respectively performing correlation operations on the CDMA codes of the received signals to obtain a plurality of corresponding first correlation values and dividing the CDMA codes into first and second code groups according to a first threshold and corresponding first correlation values;

a signal regeneration unit coupled to the first detection unit, performing an interference cancellation procedure on the received signals to remove signals corresponding to the first code group therefrom and obtaining a removed signal;

a second detection unit coupled to the signal regeneration unit and the first detection unit, respectively performing correlation operations on the CDMA codes of the removed signal to obtain a plurality of corresponding second correlation values and subtracting each of the first correlation values from the corresponding one of the second correlation values to generate a subtraction result and comparing each subtraction result with a second threshold to generate a comparison result, wherein each of the second correlation values corresponds to one of the first correlation values; and a feedback control unit coupled to the first detection unit, the signal regeneration unit and the second detection unit, determining whether the CDMA codes within the first code group are correct according to the comparison results, wherein the feedback control unit further adjusts the first threshold dynamically according to the comparison results.

12. The multi-user detection system as claimed in claim 11, wherein the feedback control unit further determines the CDMA codes within the first code group are correct when the comparison results corresponding thereto indicate that all of the subtraction results, each generated by subtracting one of the first correlation values from the corresponding second correlation value, exceed the second threshold.

13. The multi-user detection system as claimed in claim 12, wherein the feedback control unit further determines the CDMA codes within the first code group are incorrect and increases the first threshold by a specific value to generate a third threshold such that the first detection unit re-divides the CDMA codes into the first and second code groups according to the third threshold and corresponding first correlation values for further processing when the comparison results corresponding thereto indicate that at least one of the subtraction results generated by subtracting one of the first correlation values from the corresponding second correlation value is less than the first threshold.

14. The multi-user detection system as claimed in claim 11, wherein the signal regeneration unit further regenerates signals corresponding to the first code group as interference signals and subtracts the interference signals from the received signals to perform the interference cancellation procedure to obtain the removed signal.

15. The multi-user detection system as claimed in claim 11, further comprising a retransmission control unit coupled to the first detection unit, determining whether a maximum correlation value among the second correlation values that correspond to the second code group exceeds a third threshold when the number of the CDMA codes within the first code group is 0, and if so, selectively requesting users corresponding to the second code group to perform a feedback retransmission operation, wherein the third threshold is less than the first threshold.

16. The multi-user detection system as claimed in claim 15, wherein when a user is requested to feedback a message, the multi-user detection system further directs the user to feedback the message with double transmission power.

17. The multi-user detection system as claimed in claim 15, wherein the multi-user detection system further applies a bitmap to designate users who need to perform the feedback retransmission operation.

18. The multi-user detection system as claimed in claim 11, wherein the first detection unit further comprises a sorter for dividing the CDMA codes into the first and second code groups, wherein the sorter classifies the first CDMA code into the first code group when the first correlation value corresponding to a first CDMA code of the CDMA codes exceeds or is equal to the first threshold and classifies the first CDMA code into the second code group when the first correlation value corresponding to the first CDMA code of the CDMA codes is less than the first threshold.

19. The multi-user detection system as claimed in claim 11, wherein the feedback control unit further stores all of the CDMA codes within the first code group into the buffer and subtracts the interference signals from the received signals after determining that the CDMA codes within the first code group to be correct.

20. The multi-user detection system as claimed in claim 11, wherein the signal regeneration unit further applies a successive interference cancellation (SIC) to perform the interference cancellation procedure.

21. A non-transitory machine-readable storage medium comprising a computer program, which, when executed, causes an apparatus to perform a method for multi-user detection in a Code Division Multiple Access (CDMA)-based channel for use in a base station receiver, comprising:

receiving signals, each comprising a CDMA code, from a communication channel;

respectively performing correlation operations on the CDMA codes of the received signals to obtain a plurality of corresponding first correlation values;

dividing the CDMA codes into first and second code groups according to a first threshold and corresponding first correlation values;

performing an interference cancellation procedure on the received signals to remove signals corresponding to the first code group therefrom and obtaining a removed signal;

respectively performing correlation operations on the CDMA codes of the removed signal to obtain a plurality of corresponding second correlation values, wherein each of the second correlation values correspond to one of the first correlation values;

subtracting each of the first correlation values from the corresponding one of the second correlation values to generate a subtraction result and comparing each subtraction result with a second threshold to generate a comparison result; and determining whether the CDMA codes within the first code group are correct according to the comparison results, wherein the first threshold is dynamically adjusted according to the comparison results.

* * * * *